(12) United States Patent
Barguno

(10) Patent No.: US 9,529,916 B1
(45) Date of Patent: Dec. 27, 2016

(54) MANAGING DOCUMENTS BASED ON ACCESS CONTEXT

(71) Applicant: Luis Barguno, Wareemba (AU)

(72) Inventor: Luis Barguno, Wareemba (AU)

(73) Assignee: GOOGLE INC., Mountain View, CA (US)

( * ) Notice: Subject to any disclaimer, the term of this patent is extended or adjusted under 35 U.S.C. 154(b) by 692 days.

(21) Appl. No.: 13/663,678

(22) Filed: Oct. 30, 2012

(51) Int. Cl.
*G06F 17/00* (2006.01)
*G06F 17/30* (2006.01)

(52) U.S. Cl.
CPC ... *G06F 17/30867* (2013.01); *G06F 17/30011* (2013.01)

(58) Field of Classification Search
USPC ................................. 715/255, 705, 810, 854
See application file for complete search history.

(56) References Cited

U.S. PATENT DOCUMENTS

| | | |
|---|---|---|
| 5,280,367 A | 1/1994 | Zuniga |
| 5,448,695 A | 9/1995 | Douglas et al. |
| 5,544,049 A | 8/1996 | Henderson et al. |
| 5,600,778 A | 2/1997 | Swanson et al. |
| 5,613,163 A | 3/1997 | Marron et al. |
| 5,721,849 A | 2/1998 | Amro |
| 5,790,127 A | 8/1998 | Anderson et al. |
| 5,821,928 A | 10/1998 | Melkus et al. |
| 5,826,015 A | 10/1998 | Schmidt |
| 5,845,300 A | 12/1998 | Comer et al. |
| 5,859,640 A | 1/1999 | de Judicibus |
| 5,877,763 A | 3/1999 | Berry et al. |
| 5,883,626 A | 3/1999 | Glaser et al. |
| 5,905,991 A | 5/1999 | Reynolds |
| 5,966,121 A | 10/1999 | Hubbell et al. |
| 6,005,575 A | 12/1999 | Colleran et al. |
| 6,018,341 A | 1/2000 | Berry et al. |
| 6,272,490 B1 | 8/2001 | Yamakita |
| 6,295,542 B1 | 9/2001 | Corbin |
| 6,301,573 B1 | 10/2001 | McIlwaine et al. |

(Continued)

FOREIGN PATENT DOCUMENTS

| | | |
|---|---|---|
| WO | WO2012057726 | 5/2012 |
| WO | WO2014072767 A1 | 5/2014 |

OTHER PUBLICATIONS

Ashman. "Electronic Document Addressing: Dealing with Change." ACM Computing Surveys, vol. 32, No. 3, Sep. 2000, pp. 201-212.

(Continued)

*Primary Examiner* — Mohammed-Ibrahim Zuberi
(74) *Attorney, Agent, or Firm* — Young Basile Hanlon & MacFarlane, P.C.

(57) ABSTRACT

Disclosed is a document management system where accessed documents can be stored in a document list along with information regarding the context in which the documents were accessed. The context can include information regarding the time and date the document was accessed and what applications were running when the document was accessed. Other context information can include whether the document was accessed during a calendar event or if the document was included in an attachment to an e-mail. When the current context of the computing device matches a previously recorded context, documents from the document list can be entered into a subset list and presented to the user.

22 Claims, 5 Drawing Sheets

(56) References Cited

U.S. PATENT DOCUMENTS

| | | |
|---|---|---|
| 6,377,965 B1 | 4/2002 | Hachamovitch et al. |
| 6,421,678 B2 | 7/2002 | Smiga et al. |
| 6,463,078 B1 | 10/2002 | Engstrom et al. |
| 6,546,393 B1 | 4/2003 | Khan |
| 6,564,213 B1 | 5/2003 | Ortega et al. |
| 6,647,383 B1 | 11/2003 | August et al. |
| 6,654,038 B1 | 11/2003 | Gajewska et al. |
| 6,751,604 B2 | 6/2004 | Barney et al. |
| 6,789,251 B1 | 9/2004 | Johnson |
| 6,820,075 B2 | 11/2004 | Shanahan et al. |
| 6,865,714 B1 | 3/2005 | Liu et al. |
| 6,889,337 B1 | 5/2005 | Yee |
| 6,907,447 B1 | 6/2005 | Cooperman et al. |
| 6,980,977 B2 | 12/2005 | Hoshi et al. |
| 7,003,506 B1 | 2/2006 | Fisk et al. |
| 7,003,737 B2 | 2/2006 | Chiu et al. |
| 7,031,963 B1 | 4/2006 | Bae |
| 7,051,277 B2 | 5/2006 | Kephart et al. |
| 7,073,129 B1 | 7/2006 | Robarts et al. |
| 7,103,835 B1 | 9/2006 | Yankovich et al. |
| 7,127,674 B1 | 10/2006 | Carroll et al. |
| 7,146,422 B1 | 12/2006 | Marlatt et al. |
| 7,295,995 B1 | 11/2007 | York et al. |
| 7,353,252 B1 | 4/2008 | Yang et al. |
| 7,353,397 B1 | 4/2008 | Herbach |
| 7,370,274 B1 | 5/2008 | Stuple et al. |
| 7,380,218 B2 | 5/2008 | Rundell |
| 7,386,789 B2 | 6/2008 | Chao et al. |
| 7,392,249 B1 | 6/2008 | Harris et al. |
| 7,395,507 B2 | 7/2008 | Robarts et al. |
| 7,406,659 B2 | 7/2008 | Klein et al. |
| 7,451,389 B2 | 11/2008 | Huynh et al. |
| 7,480,715 B1 | 1/2009 | Barker et al. |
| 7,487,145 B1 | 2/2009 | Gibbs et al. |
| 7,499,919 B2 | 3/2009 | Meyerzon et al. |
| 7,499,940 B1 | 3/2009 | Gibbs |
| 7,647,312 B2 | 1/2010 | Dai |
| 7,664,786 B2 | 2/2010 | Oh et al. |
| 7,685,144 B1 | 3/2010 | Katragadda |
| 7,685,516 B2 | 3/2010 | Fischer |
| 7,716,236 B2 * | 5/2010 | Sidhu et al. ............... 707/766 |
| 7,734,627 B1 | 6/2010 | Tong |
| 7,756,935 B2 | 7/2010 | Gaucas |
| 7,761,788 B1 | 7/2010 | McKnight et al. |
| 7,769,579 B2 | 8/2010 | Zhao et al. |
| 7,774,328 B2 | 8/2010 | Hogue et al. |
| 7,779,355 B1 | 8/2010 | Erol et al. |
| 7,783,965 B1 | 8/2010 | Dowd et al. |
| 7,818,678 B2 | 10/2010 | Massand |
| 7,836,044 B2 | 11/2010 | Kamvar et al. |
| 7,917,848 B2 | 3/2011 | Harmon et al. |
| 8,020,003 B2 | 9/2011 | Fischer |
| 8,020,112 B2 | 9/2011 | Ozzie et al. |
| 8,027,974 B2 | 9/2011 | Gibbs |
| 8,051,088 B1 | 11/2011 | Tibbetts et al. |
| 8,086,960 B1 | 12/2011 | Gopalakrishna et al. |
| 8,091,020 B2 | 1/2012 | Kuppusamy et al. |
| 8,117,535 B2 | 2/2012 | Beyer et al. |
| 8,185,448 B1 | 5/2012 | Myslinski |
| 8,224,802 B2 | 7/2012 | Hogue |
| 8,229,795 B1 | 7/2012 | Myslinski |
| 8,239,751 B1 | 8/2012 | Rochelle et al. |
| 8,260,785 B2 | 9/2012 | Hogue et al. |
| 8,261,192 B2 | 9/2012 | Djabarov |
| 8,346,620 B2 | 1/2013 | King et al. |
| 8,346,877 B2 | 1/2013 | Turner |
| 8,359,550 B2 | 1/2013 | Meyer et al. |
| 8,370,275 B2 | 2/2013 | Bhattacharya et al. |
| 8,386,914 B2 | 2/2013 | Baluja et al. |
| 8,453,066 B2 | 5/2013 | Ozzie et al. |
| 8,458,046 B2 | 6/2013 | Myslinski |
| 8,572,388 B2 | 10/2013 | Boemker et al. |
| 8,595,174 B2 | 11/2013 | Gao et al. |
| 8,621,222 B1 | 12/2013 | Das |
| 8,667,394 B1 | 3/2014 | Spencer |
| 8,782,516 B1 | 7/2014 | Dozier |
| 8,799,765 B1 | 8/2014 | MacInnis et al. |
| 8,856,640 B1 | 10/2014 | Barr et al. |
| 8,856,645 B2 | 10/2014 | Vandervort et al. |
| 8,904,284 B2 | 12/2014 | Grant et al. |
| 2001/0025287 A1 | 9/2001 | Okabe et al. |
| 2002/0010725 A1 | 1/2002 | Mo |
| 2002/0029337 A1 | 3/2002 | Sudia et al. |
| 2002/0035714 A1 | 3/2002 | Kikuchi et al. |
| 2002/0069223 A1 | 6/2002 | Goodisman et al. |
| 2002/0070977 A1 | 6/2002 | Morcos et al. |
| 2002/0103914 A1 | 8/2002 | Dutta et al. |
| 2002/0129100 A1 | 9/2002 | Dutta et al. |
| 2002/0152255 A1 | 10/2002 | Smith, Jr. et al. |
| 2002/0161839 A1 | 10/2002 | Colasurdo et al. |
| 2002/0187815 A1 | 12/2002 | Deeds et al. |
| 2003/0046263 A1 | 3/2003 | Castellanos et al. |
| 2003/0058286 A1 | 3/2003 | Dando |
| 2003/0069877 A1 | 4/2003 | Grefenstette et al. |
| 2003/0156130 A1 | 8/2003 | James et al. |
| 2003/0172353 A1 | 9/2003 | Cragun |
| 2003/0200192 A1 | 10/2003 | Bell et al. |
| 2003/0234822 A1 | 12/2003 | Spisak |
| 2004/0061716 A1 | 4/2004 | Cheung et al. |
| 2004/0062213 A1 | 4/2004 | Koss |
| 2004/0122846 A1 | 6/2004 | Chess et al. |
| 2004/0139465 A1 | 7/2004 | Matthews, III et al. |
| 2004/0140901 A1 | 7/2004 | Marsh |
| 2004/0145607 A1 | 7/2004 | Alderson |
| 2004/0153973 A1 | 8/2004 | Horwitz |
| 2004/0164991 A1 | 8/2004 | Rose |
| 2004/0177319 A1 | 9/2004 | Horn |
| 2005/0024487 A1 | 2/2005 | Chen |
| 2005/0028081 A1 | 2/2005 | Arcuri et al. |
| 2005/0034060 A1 | 2/2005 | Kotler et al. |
| 2005/0039191 A1 | 2/2005 | Hewson et al. |
| 2005/0044132 A1 | 2/2005 | Campbell et al. |
| 2005/0044369 A1 | 2/2005 | Anantharaman |
| 2005/0055416 A1 | 3/2005 | Heikes et al. |
| 2005/0120308 A1 | 6/2005 | Gibson et al. |
| 2005/0144162 A1 | 6/2005 | Liang |
| 2005/0144573 A1 | 6/2005 | Moody et al. |
| 2005/0160065 A1 | 7/2005 | Seeman |
| 2005/0183001 A1 | 8/2005 | Carter et al. |
| 2005/0183006 A1 | 8/2005 | Rivers-Moore et al. |
| 2005/0198589 A1 | 9/2005 | Heikes et al. |
| 2005/0210256 A1 | 9/2005 | Meier et al. |
| 2005/0246653 A1 | 11/2005 | Gibson et al. |
| 2006/0005142 A1 | 1/2006 | Karstens |
| 2006/0010865 A1 | 1/2006 | Walker |
| 2006/0041836 A1 | 2/2006 | Gordon et al. |
| 2006/0047682 A1 | 3/2006 | Black et al. |
| 2006/0080303 A1 | 4/2006 | Sargent et al. |
| 2006/0106778 A1 | 5/2006 | Baldwin |
| 2006/0136552 A1 | 6/2006 | Krane et al. |
| 2006/0150087 A1 | 7/2006 | Cronenberger et al. |
| 2006/0190435 A1 | 8/2006 | Heidloff et al. |
| 2006/0213993 A1 | 9/2006 | Tomita |
| 2006/0248070 A1 | 11/2006 | Dejean et al. |
| 2007/0005581 A1 | 1/2007 | Arrouye et al. |
| 2007/0005697 A1 | 1/2007 | Yuan et al. |
| 2007/0033200 A1 | 2/2007 | Gillespie |
| 2007/0143317 A1 | 6/2007 | Hogue et al. |
| 2007/0150800 A1 | 6/2007 | Betz et al. |
| 2007/0162907 A1 | 7/2007 | Herlocker |
| 2007/0168355 A1 | 7/2007 | Dozier et al. |
| 2007/0198952 A1 | 8/2007 | Pittenger |
| 2007/0220259 A1 | 9/2007 | Pavlicic |
| 2007/0280205 A1 | 12/2007 | Howell et al. |
| 2007/0291297 A1 | 12/2007 | Harmon et al. |
| 2008/0022107 A1 | 1/2008 | Pickles et al. |
| 2008/0028284 A1 | 1/2008 | Chen |
| 2008/0034213 A1 | 2/2008 | Boemker et al. |
| 2008/0059539 A1 | 3/2008 | Chin et al. |
| 2008/0077571 A1 | 3/2008 | Harris |
| 2008/0082907 A1 | 4/2008 | Sorotokin et al. |
| 2008/0120319 A1 | 5/2008 | Drews et al. |
| 2008/0172608 A1 | 7/2008 | Patrawala et al. |
| 2008/0208969 A1 | 8/2008 | Van Riel |

(56) References Cited

U.S. PATENT DOCUMENTS

| | | |
|---|---|---|
| 2008/0239413 A1 | 10/2008 | Vuong et al. |
| 2008/0320397 A1 | 12/2008 | Do et al. |
| 2009/0006936 A1 | 1/2009 | Parker et al. |
| 2009/0013244 A1 | 1/2009 | Cudich et al. |
| 2009/0044143 A1 | 2/2009 | Karstens |
| 2009/0044146 A1 | 2/2009 | Patel et al. |
| 2009/0083245 A1 | 3/2009 | Ayotte et al. |
| 2009/0094178 A1 | 4/2009 | Aoki |
| 2009/0132560 A1 | 5/2009 | Vignet |
| 2009/0192845 A1 | 7/2009 | Gudipaty et al. |
| 2009/0198670 A1 | 8/2009 | Shiffer et al. |
| 2009/0204818 A1 | 8/2009 | Shin et al. |
| 2009/0282144 A1 | 11/2009 | Sherrets et al. |
| 2009/0292673 A1 | 11/2009 | Carroll |
| 2010/0070448 A1 | 3/2010 | Omoigui |
| 2010/0070881 A1 | 3/2010 | Hanson et al. |
| 2010/0076946 A1 | 3/2010 | Barker et al. |
| 2010/0100743 A1 | 4/2010 | Ali et al. |
| 2010/0121888 A1 | 5/2010 | Cutting et al. |
| 2010/0131523 A1* | 5/2010 | Yu et al. .................. 707/756 |
| 2010/0180200 A1* | 7/2010 | Donneau-Golencer et al. .................. 715/705 |
| 2010/0191744 A1 | 7/2010 | Meyerzon et al. |
| 2010/0198821 A1 | 8/2010 | Loritz et al. |
| 2010/0223541 A1 | 9/2010 | Clee et al. |
| 2010/0251086 A1 | 9/2010 | Haumont et al. |
| 2010/0268700 A1 | 10/2010 | Wissner et al. |
| 2010/0269035 A1 | 10/2010 | Meyer et al. |
| 2010/0275109 A1 | 10/2010 | Morrill |
| 2010/0281353 A1 | 11/2010 | Rubin |
| 2011/0016106 A1 | 1/2011 | Xia |
| 2011/0023022 A1 | 1/2011 | Harper et al. |
| 2011/0043652 A1 | 2/2011 | King et al. |
| 2011/0060584 A1 | 3/2011 | Ferrucci et al. |
| 2011/0072338 A1 | 3/2011 | Caldwell |
| 2011/0082876 A1 | 4/2011 | Lu et al. |
| 2011/0087973 A1 | 4/2011 | Martin et al. |
| 2011/0126093 A1 | 5/2011 | Ozzie et al. |
| 2011/0173210 A1 | 7/2011 | Ahn et al. |
| 2011/0179378 A1 | 7/2011 | Wheeler et al. |
| 2011/0191276 A1 | 8/2011 | Cafarella et al. |
| 2011/0209064 A1 | 8/2011 | Jorgensen et al. |
| 2011/0209075 A1 | 8/2011 | Wan |
| 2011/0219291 A1 | 9/2011 | Lisa |
| 2011/0225482 A1 | 9/2011 | Chan et al. |
| 2011/0225490 A1 | 9/2011 | Meunier |
| 2011/0252312 A1 | 10/2011 | Lemonik et al. |
| 2011/0276538 A1 | 11/2011 | Knapp et al. |
| 2011/0296291 A1 | 12/2011 | Melkinov et al. |
| 2011/0306028 A1 | 12/2011 | Galimore |
| 2012/0078826 A1 | 3/2012 | Ferrucci et al. |
| 2012/0084644 A1 | 4/2012 | Robert et al. |
| 2012/0095979 A1 | 4/2012 | Aftab et al. |
| 2012/0116812 A1 | 5/2012 | Boone et al. |
| 2012/0124053 A1 | 5/2012 | Ritchford et al. |
| 2012/0166924 A1 | 6/2012 | Larson et al. |
| 2012/0185473 A1 | 7/2012 | Ponting et al. |
| 2012/0203734 A1 | 8/2012 | Spivack et al. |
| 2012/0226646 A1 | 9/2012 | Donoho et al. |
| 2012/0254730 A1 | 10/2012 | Sunderland et al. |
| 2012/0284602 A1 | 11/2012 | Seed et al. |
| 2012/0304046 A1 | 11/2012 | Neill et al. |
| 2012/0317046 A1 | 12/2012 | Myslinski |
| 2013/0036344 A1 | 2/2013 | Ahmed et al. |
| 2013/0041685 A1 | 2/2013 | Yegnanarayanan |
| 2013/0132566 A1 | 5/2013 | Olsen et al. |
| 2013/0165086 A1 | 6/2013 | Doulton |
| 2013/0212062 A1 | 8/2013 | Levy et al. |
| 2013/0246346 A1 | 9/2013 | Khosrowshahi et al. |
| 2013/0268830 A1 | 10/2013 | Khosrowshahi et al. |
| 2014/0006399 A1* | 1/2014 | Vasudevan ........ G06F 17/30867 707/737 |
| 2014/0013197 A1 | 1/2014 | McAfee et al. |
| 2014/0032913 A1 | 1/2014 | Tenenboym et al. |
| 2014/0040249 A1 | 2/2014 | Ploesser et al. |
| 2014/0236958 A1* | 8/2014 | Vaughn .................. G06F 17/30 707/741 |

OTHER PUBLICATIONS

ISR and Written Opinion of the International Searching Authority in PCT Application No. PCT/US2011/037862, dated Oct. 31, 2011, 64 pages.

Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.

Fox. "Maps API Blog: Creating Dynamic Client-side Maps Mashups with Google Spreadsheets." Mar. 2007, [retrieved on Dec. 5, 2011]. Retrieved from the Internet: <URL:http://googlemapsapi.blogspot.com/2007/03/creating-dynamic-client-side-maps.html>. 2 pages.

GeekRant.org' [online]. "How to Embed a Word Document in Another Word Document," Sep. 14, 2005, [retrieved on Dec. 5, 2011]. Retrieved from the Internet: <URL:http://www.geekrant.org/2005109/14/word-embed-document/>. 6 pages.

Herrick. "Google this Using Google Apps for Collaboration and Productivity." Proceedings of the ACM Siguccs Fall Conference on User Services Conference, Siguccs '09, Jan. 2009, p. 55.

https://en.wikipedia.org/wiki/Backus%E2%80%93Naur_Form, as of Jul. 14, 2013.

https://en.wikipedia.org/wiki/Regular_expression, as of Sep. 2, 2013.

Kappe. "Hyper-G: A Distributed Hypermedia System." Proceedings of the International Networking Conference, 1993, [retrieved on Oct. 20, 2011]. Retrieved from the Internet: <URL:http://ftp.iicm.tugraz.at/pub/papers/inet93.pdf>. 9 pages.

Kircher. "Lazy Acquisition." Proceedings of the 6th European Conference on Pattern Languages of Programs, Jul. 2011, pp. 1-11.

Microsoft Support' [online]. "How to Embed and Automate Office Documents with Visual Basic," Mar. 27, 2007, [retrieved on Dec. 5, 2011]. Retrieved from the Internet: <URLhttp://support.microsoft.com/kb/242243>. 6 pages.

Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.

Oracle Provider for OLE DB-Developer's Guide. 10g Release 1 (10.1) Dec. 2003, Oracle Corp., 90 pages.

Pinkas et al. "CMS Advanced Electrponic Signatures," Request for Comments 5126, Feb. 2008, 142 pages.

WebArchive' [online]. "Supplementary Notes for MFC Programming Module 23 and Module 27: Interfaces, COM.COM + and OLE" in: http://www.tenouk.com/visualcplusmfc/mfcsupp/ole.html, Jan. 6, 2008, [retrieved on Dec. 5, 2011]. Retrieved from the Internet: <URL:http://web.archive.org/web/20091125073542/http://www.tenouk.com/visualcplusmfc/mfcsupp/ole.html>. 4 pages.

"Bohman, P. ""Introduction to Web Accessibility"", Oct. 2003, ebAIM, printed Apr. 17, 2004,<http://www.webaim.org/intro/?templatetype=3> (p. 1-6)".

"Caldwell et al., ""Web Content Accessibility Guidelines 2.0, W3C Working Draft Mar. 11, 2004""", Mar. 11, 2004, WorldWide Web Consortium (p. 1-56)".

Griesser, A., "A generic editor Full text," pp. 50-55, 1997 ACM Press NewYork, NY, USA.

Francik, E., Computer-& screen-based interfaces: Universal design filter, Human Factors Engineering, Pacific Bell Version 2, Jun. 6, 1996.

Jacobs, Ian, et al., "User Agent Accessibility Guidelines 1.0, W3C Recommendation Dec. 17, 2002", World Wide Web Consortium, 115 pages.

Treviranus, Jutta, et al., "Authoring Tool Accessibility Guidelines 1.0, W3C Recommendation Feb. 3, 2000", World Wide Web Consortium (p. 1-22).

(56) References Cited

OTHER PUBLICATIONS

Herb Tyson, Microsoft Word 2010 Bible, John Wiley & Sons, pp. 221, 757, 833, Jun. 21, 2010.
David Sawyer McFarland, "CSS the missing manual", O'Reilly, Aug. 2009, pp. 7-101, 134-138, 428-429.

* cited by examiner

MANAGING DOCUMENTS BASED ON ACCESS CONTEXT

TECHNICAL FIELD

This disclosure relates in general to prioritizing and managing documents based on information gathered from a user's access history, recent e-mails or concurrent collaborators and in particular to managing documents related to a context in which the documents were accessed.

BACKGROUND

Computing devices can be used to create and manage documents for a user. Documents can include text documents, spreadsheets, pictures, videos, presentations, e-mail messages or web pages, for example. A user can create documents on one or more computing devices and store the documents locally or on a server to allow the stored documents to be accessed on multiple computing devices. Storing documents on a server, sometimes called "cloud" storage, permits a document to be shared among users so as to permit documents to be viewed and edited by more than one user on more than one computing device.

SUMMARY

Disclosed herein are aspects of systems, methods and apparatuses for managing computer-based documents. One method includes identifying one or more documents accessed by a user including a context in which the one or more documents were accessed, wherein the context includes date and time information and one or more of an application, a document, a calendar event, a shared document or an email message, creating a document list that includes the one or more documents including the context in which the one or more documents were accessed, identifying a current context, creating a subset list from the document list based on the current context; and presenting the subset list to the user.

Another aspect of the teachings herein includes an apparatus for managing documents including a memory and a processor. The processor is configured to execute instructions stored in memory to identify one or more documents accessed by a user including a context in which the one or more documents were accessed, wherein the context includes date and time information and one or more of an application, a document, a calendar event, a shared document or an email message, create a document list that includes the one or more documents including the context in which the one or more documents were accessed, identify a current context; create a subset list from the document list based on the current context; and present the subset list to the user.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Computing devices can be used to create and manage documents for a user. As computing devices become more powerful and include larger and more varied storage options, it can become increasingly difficult for users to keep track of documents. For example, storage devices are now available that exceed one terabyte of storage for a single computing device. A user may have access to multiple computing devices including desktop computers, laptop computers, tablet computers and mobile phones, all connected via networks from time to time, each of which can create and store documents that can be accessed on other computing devices. In addition, a computing device can be connected to a server via a network that provides storage for documents.

The various computing and storage options available to a user can make it difficult to access a desired document. In this disclosure, "access" will refer to the process of locating a file representing a document and making use of the contents of the file with a computing device. For example, a document can be accessed by a word processing application for viewing or editing. Document access can be complicated by the fact that a document to be accessed could be one of thousands of documents stored on large capacity storage device. In other cases the document may not be stored locally on the computing device currently being used by the user, but rather in memory or local storage on another computing device accessible, for example, via a network. In yet other cases the document can be stored in cloud storage accessible via a wide-area network (WAN) such as the internet or a cellular telephone network.

Aspects of the teachings herein can improve the efficiency with which documents are accessed by creating a list of documents and the context in which they were previously accessed. Context can be defined as the state of the computing device at a particular point in time. Context can include the time of day, the day of the week, which applications are currently running, which calendar events may be occurring, what storage devices are available locally or networked, what cloud storage is available, what web sites may be active, what e-mail messages may be open and/or whether a document is a shared document. A subset of the list of documents that were accessed in contexts similar to the current context can be provided. When a user performs an operation that accesses a document, for example by selecting a menu item that activates an "open document" dialog box, the computing device can examine the current context and provide the user with a list of suggested documents that were accessed in a similar context.

First discussed below are environments in which aspects of this disclosure can be implemented. Then, details of certain implementations are described.

Figure 1:
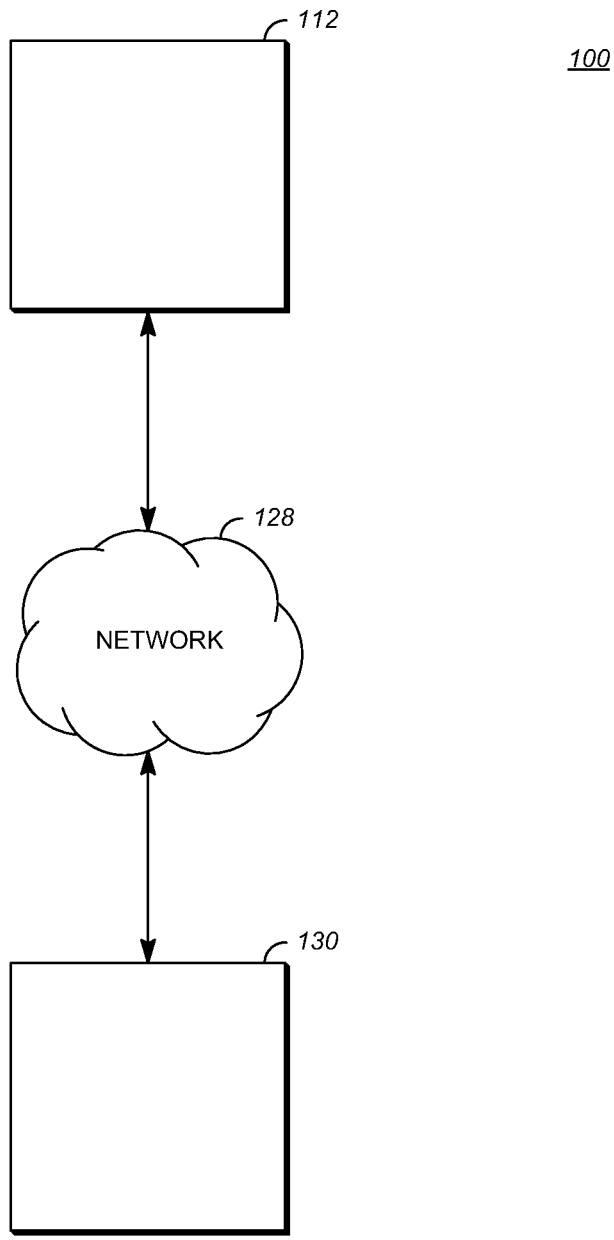
FIG. 1 is a schematic diagram of a computing system.

FIG. 1 is a schematic diagram of a computing system 100. An exemplary computing station 112 can be, for example, a computer having an internal configuration of hardware such as that described in FIG. 2. However, other suitable implementations of computing station 112 are possible. For example, the processing of computing station 112 can be distributed among multiple devices.

A network 128 can connect computing station 112 and a server station 130 for storing documents or calendar information. For example, a document can be created at computing station 112 and transmitted to cloud storage at server station 130. Network 128 can be, for example, the Internet. Network 128 can also be a local area network (LAN), WAN, virtual private network (VPN), cellular telephone network or any other means of transferring the data from computing station 112 to, in this example, server station 130.

Figure 2:
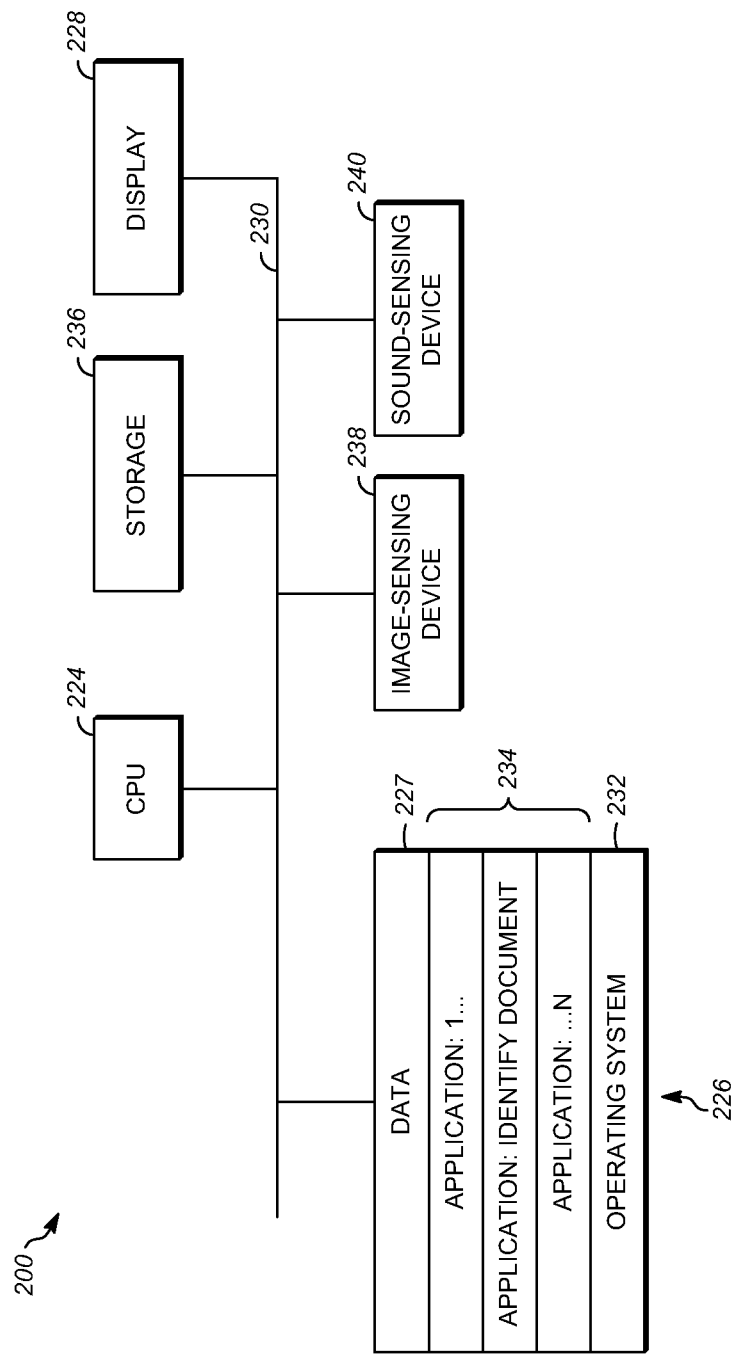
FIG. 2 is a block diagram of an exemplary computing device that can implement a computing station or server station according to an implementation.

Server station 130, in one example, can be a computer having an internal configuration of hardware such as that described in FIG. 2. However, other suitable implementations of server station 130 are possible. For example, the processing of server station 130 can be distributed among multiple devices.

Other implementations of computing system 100 are possible. For example, an implementation can omit network 128. In another implementation, documents may be created and then stored for transmission at a later time to server station 130 or any other device having memory. In one implementation, server station 130 receives (e.g., via network 128, a computer bus, and/or some communication pathway) and stores documents for later access.

FIG. 2 is a block diagram of an exemplary computing device 200 that can implement a computing station or server station according to an implementation. For example, computing device 200 can implement one or both of computing station 112 and server station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include an application that performs the methods described here. Computing device 200 can also include a secondary storage 236, which can, for example, be a memory card used with computing device 200 when it is mobile. Documents may contain a significant amount of information, so they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228, such as a keyboard or speakers. When the output device is or includes display 228, display 228 can be implemented in various ways, including by a liquid crystal display (LCD), a cathode-ray tube (CRT) display or a light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone or any other sound-sensing device now existing or hereafter developed that can sense sounds near computing device 200. Sound-sensing device 240 can be positioned such that it is directed toward a user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
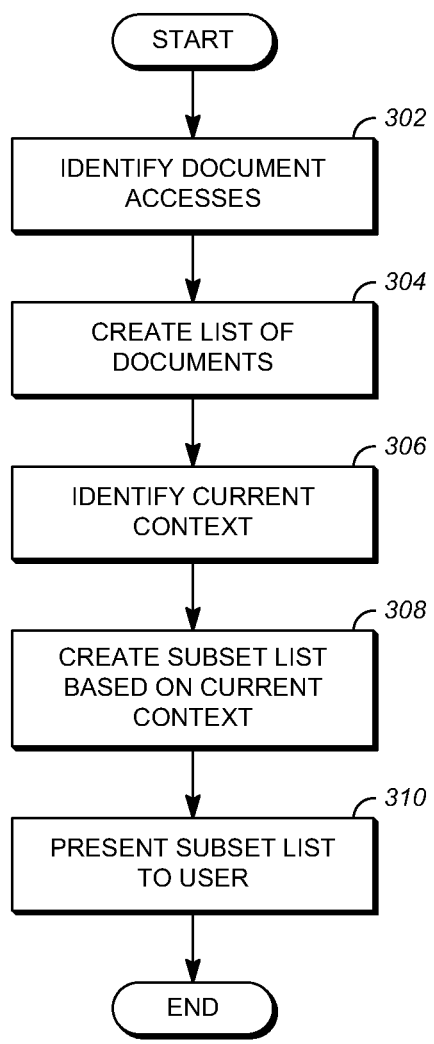
FIG. 3 is a flowchart of a process for managing documents according to an implementation.

FIG. 3 is a flowchart of a process 300 for managing documents according to an implementation. Process 300 can be implemented, for example, as a software program that is executed by computing devices such as computing station 112 or server station 130. The software program can include machine-readable instructions that are stored in a memory such as memory 226 that, when executed by a processor such as CPU 224, cause the computing device to perform process 300. Process 300 can also be implemented using hardware. As explained above, some computing devices may have multiple memories and multiple processors, and the steps of process 300 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 302, process 300 identifies document accesses by a user of a computing device. Identify means associate, determine, distinguish, relate or identify in any manner whatsoever. A document can be accessed locally, where the document can be stored in memory or a storage device associated with a computing device or remotely, where a document can be stored in memory or a storage device located on a network. A document can also be regarded as accessed when it is accessed by some or all other collaborators accessing a shared document. Document accesses can also include e-mail events, such as receiving a document as an attachment to an e-mail message with, for example, a notice that the document is being shared with the user. In these latter two cases, a document access can occur without locating or making use of the contents of the document by an application by a user of a computing device. Instead, process 300 can identify the document as being accessed based on other activities that include the document. Documents can be files managed by a file system of computing device 200. In addition to the contents of a document, the file system can store identifying information about the document including its file name, location, creation date and last-modified date, the identity of the user who created the document and information regarding whether the document is shared with other users, for example.

Identifying document accesses can include recording at least some information from the document's identifying information along with information regarding the context at the time the document was accessed. For example, a user can open a document representing a task list in the morning upon arriving at work at about the same time. According to the teachings herein, these accesses can be identified by recording identifying file information and context information based on these accesses.

Identifying document accesses can be made more robust by adding tolerances to the time of day. For example, a document access occurring within an hour of the previous day's access time can be considered as happening at the same time of day. This time tolerance can be adjustable and can be set by a user. Process 300 may also be made tolerant of missing days, including weekends, holidays and occasional missed work days due to illness, vacations or travel.

At step 304, process 300 compiles a context list of document accesses including the context. The collection of context entries is called a "list" for ease of explanation herein. However, the context entries can be included in any type of data structure suitable for managing a collection of context entries. This step can also be called logging. The context with which a document was accessed can include the identity of the user that accessed the document and the time of day and the day of the week the document was accessed. The context can also include the location of the document and from which computing device it was accessed. The context can also include which application program was used to access the program and which application programs are also running on the computing device at or near the time the program was accessed.

Special cases associated with compiling a context list of document accesses includes calendar applications, e-mail applications and shared document access. In the case of calendar applications, the context for a document access can be associated with an event. For example, if a document is accessed proximate to the time of a recurring event, the context for that document can associate it with the recurring event so that the document can be suggested to the user for access whenever the recurring event occurs. The document can be compiled into a document list or logged where the context can include the recurring event.

Context for documents included as attachments to e-mail messages can be associated with the sender or with the e-mail message associated with the original e-mail. For example, some e-mail programs permit the use of topic "threads" that associate incoming e-mails with a list of previous e-mails. A document previously included as an attachment to an e-mail message can have a context associated with the e-mail thread or with the sender of the e-mail. The document can be compiled into the context list and the context can include arrival of a new e-mail from the same recipient or belonging to the same thread.

Context for documents that are shared can include document accesses by users sharing the document. Shared documents can be a single copy of a document stored on a server or other storage devices where the document is available to more than one user. When any one of the users sharing the document makes changes to a document, the changes are made to the one shared copy so that they are available to all shared users. The context for a shared document can include another user on another computing device accessing a shared document. The document can be added to the document list and the context can include access of the shared document by any of the users sharing the document.

Figure 4:
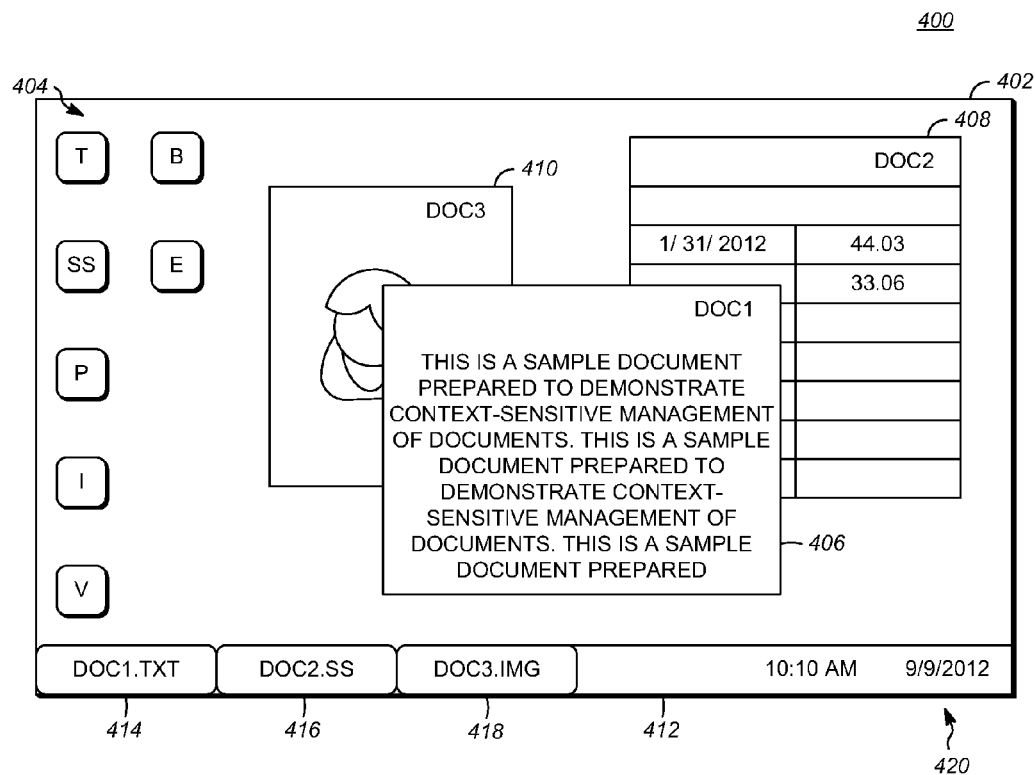
FIG. 4 is a diagram of a computing device display including documents according to an implementation.

At step 306, process 300 identifies the current context of the computing device. The context identified at this step can include the current time of day, the day of the week, which applications are currently running on the computing device, whether a calendar event is occurring or is close to occurring, whether a shared document is being accessed on any computer in network communication with the computing device, or whether an e-mail message is being accessed, for example. FIG. 4 is a diagram of a computing device display including documents according to an implementation. As discussed in more detail herein, FIG. 4 shows examples of a current context.

At step 308, the current context identified at step 306 is used to sort the document list formed at step 304 to create a subset list based on the current context. Sorting the context list includes matching the current context to the contexts stored with the documents in the context list. When the current context matches the context stored in the list, the documents corresponding to the matched contexts are entered into a subset list that represents a subset of the documents from the documents list. The subset list can include file identifier information for the documents used to access the documents.

Figure 5:
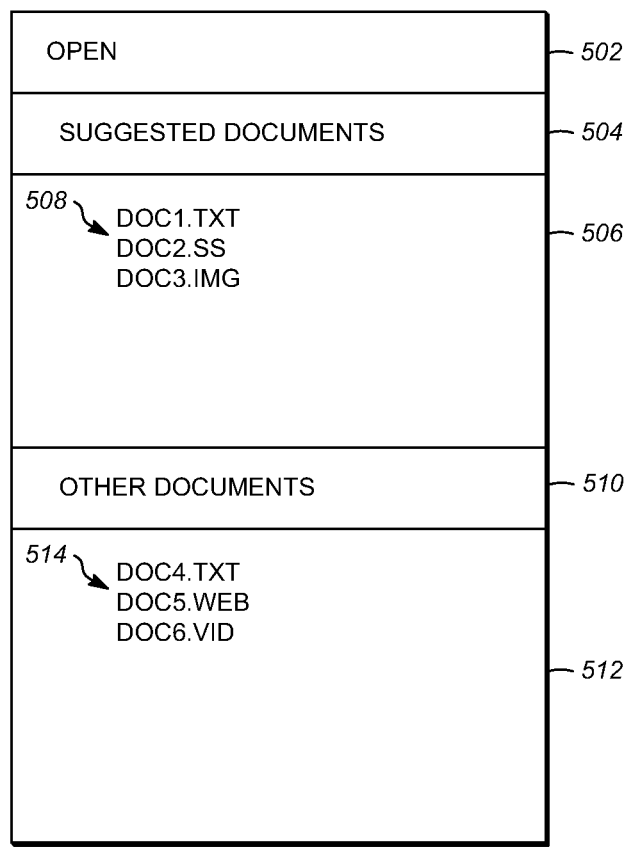
FIG. 5 is a diagram of a user interface for opening documents according to an implementation.

At step 310, the subset list is presented to the user. The subset list can be presented in response to a user's selection of an "open" menu item in an application, for example. FIG. 5 is a diagram of a user interface for opening documents according to an implementation. For example, FIG. 5 includes an example of a subset list presented to a user in response to a request to open a document as part of an open dialog box. The subset list can be presented as a separate section of an open dialog box in an implementation. The subset list can give the user an option to open documents that have been identified based on their stored context matching the current context of the computing device in addition to the standard list of documents that may be included in an open dialog box (e.g., recent documents). For additional ease of use, the subset list can be organized using date and time information. For example, items of the subset list can be grouped by date and time information such as today, yesterday or last week and can be listed in chronological or reverse chronological order based on their last accessed or last saved date and time.

The subset list can be presented to the user in response to any action that uses a list of documents. For example, selecting a menu item in an application that opens documents or selecting a "recent items" menu item could be such an action. The computing device can also be programmed to present the subset list whenever the current context matches a context stored in the documents list and a subset list is created. Once the subset list is presented to the user in step 310, the user can select one of the documents on the subset list or close the subset list or otherwise ignore the subset list. Other ways that the subset list can be employed by process 300 include using the subset list as suggested inputs to search applications, for example, or as suggested documents to be used in conjunction with web browser applications that can use documents as input.

In FIG. 4, a computing device 400 includes a display 402 showing a group of icons 404 representing applications including a text processing application T, a spreadsheet application SS, a presentation application P, an image processing application I, a video processing application V, a web browser application B and an e-mail application E. Display 402 shows three open documents, a text processing document 406, a spreadsheet document 408 and an image document 410. Display 402 includes a taskbar 412 that displays three task identifiers 414, 416 and 418 corresponding to documents 406, 408 and 410. Taskbar 412 also includes a date and time display 420 that indicates the time of day and the date. Taken together, task identifiers 414, 416 and 418 and date and time display 420 can be included in the current context. For example, identifiers for the three documents 406, 408 and 410 in the context list of documents can be included with a context that includes three documents, "DOC1.TXT," "DOC2.SS" and "DOC3.IMG" being open. The context can include the three documents, text processing application T, spreadsheet application SS and image processing application I and date and time 420, for example.

An open dialog box 500, shown by example in FIG. 5, includes a title bar 502 that identifies this dialog box as an open dialog box. Dialog box 500 can appear on a display in response to a request by the user to open a document, for example. Suggested documents section header 504 indicates that suggested documents section 506 includes documents suggested by, for example, step 310 of FIG. 3. Suggested documents section 506 includes file names 508 derived from the identifier information stored in a subset list derived from the context list of documents based on the current context. For example, if a user previously opened "DOC1.TXT," 'DOC3.SS" and "DOC3.IMG" during a recurring meeting that occurred at a previous time, these documents could be stored in a context list by storing document identifiers along with the concurrent context information in the context list. At another time, when the recurring meeting occurs again, a subset list can be created that includes the documents stored in the context list associated with the current context that includes the recurring event. This can result in file names 508 being included in dialog box 500 in suggested documents section 506 as shown in FIG. 5.

FIG. 5 also shows other documents header 510 and other documents section 512 that includes a list 514 of other documents. List 514 includes any documents that are usually displayed by open dialog box 500, such as documents occurring in a directory or folder currently being displayed by open dialog box 500. The usual tools available to a user to navigate to files or folders can be available as part of open dialog box 500.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of computing station 112 and/or server station 130 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of computing station 112 and server station 130 do not necessarily have to be implemented in the same manner.

Further, in one aspect, for example, computing station 112 or server station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

All or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for managing documents, comprising:
   identifying, with a processor, one or more documents accessed by a user including a context in which the one or more documents were accessed;
   wherein the context includes date and time information corresponding to when the one or more documents were accessed, identifying information associated with one or more of an application, a document, a calendar event, a shared document, or an email message that is open within a time tolerance of the date and time information corresponding to when the one or more documents were accessed, identifying information including a location of the one or more documents and computing devices from which the one or more documents were accessed, the time tolerance including non-recurring unscheduled absent date information that associates the date and time information corresponding to when the one or more documents were accessed with one or more non-recurring unscheduled absent dates;
   creating a document list that includes the one or more documents including the context in which the one or more documents were accessed;
   identifying a current context including at least a current time;
   creating a subset list from the document list based on the current context; and
   presenting the subset list to the user.

2. The method of claim 1 wherein the one or more documents includes at least one of a text document, a spreadsheet, a presentation, an image, a video, an email message or a web page.

3. The method of claim 1 wherein identifying the one or more documents accessed by a user comprises:
   recording a respective title and location for each of the one or more documents.

4. The method of claim 1 wherein the shared document is a single-copy document shared on a server and wherein the context further includes identifying information for accesses of the single-copy document by users sharing the single-copy document and identifying information for a user who created the single-copy document.

5. The method of claim 1 wherein the email message includes that the one or more documents was received as an e-mail attachment.

6. The method of claim 1 wherein presenting the subset list comprises:
   presenting the subset list to the user in an open dialog box.

7. The method of claim 1 wherein the time tolerance includes a tolerance for weekends, holidays, or missed work days.

8. The method of claim 1 wherein the time tolerance is adjustable by the user.

9. The method of claim 1, further comprising:
   presenting the subset list to a search application that can use documents as input.

10. The method of claim 1, wherein the context further includes identifying information for applications from which the one or more documents were accessed.

11. The method of claim 1, wherein the subset is presented to the user in response to an action that uses a list of documents, and wherein the user can select a document from the subset list, close the subset list, or ignore the subset list.

12. The method of claim 11, wherein the action that uses a list of documents is an open action in an application, and wherein the subset list is presented as a separate section of a user interface presented in response to the open action.

13. The method of claim 1, wherein the context further includes identifying information for available storage devices.

14. The method of claim 1, further comprising:
   determining when the one or more documents are accessed proximate to the time of a recurring event; and
   associating the recurring event with the one or more documents, wherein the context further includes the recurring event associated with the one or more documents.

15. The method of claim 14, wherein the context further includes threads associated with the email message.

16. An apparatus for managing documents, comprising:
   a memory; and
   a processor to execute instructions stored in memory to:
      identify one or more documents accessed by a user including a context in which the one or more documents were accessed;
      wherein the context includes date and time information corresponding to when the one or more documents were accessed, identifying information associated with one or more of an application, a document, a calendar event, a shared document, or an email message that is open within a time tolerance of the date and time information corresponding to when the one or more documents were accessed, identifying information including a location of the one or more documents and source computing devices from which the one or more documents were accessed, the time tolerance including non-recurring unscheduled absent date information that associates the date and time information corresponding to when the one or more documents were accessed with one or more non-recurring unscheduled absent dates;
      create a document list that includes the one or more documents including the context in which the one or more documents were accessed;
      identify a current context including at least a current time;
      create a subset list from the document list based on the current context; and
      present the subset list to the user.

17. The apparatus of claim 16 wherein the one or more documents includes at least one of a text document, a spreadsheet, a presentation, an image, a video, an email message or a web page.

18. The apparatus of claim 16 wherein the processor is configured to identify the one or more documents by recording a respective title and location for each of the one or more documents.

19. The apparatus of claim 16 wherein the shared document is a single-copy document shared on a server and wherein the context further includes identifying information for accesses of the single-copy document by users sharing the single-copy document and identifying information for a user who created the single-copy document.

20. The apparatus of claim 16 wherein the email message includes that the one or more documents was received as an e-mail attachment.

21. The apparatus of claim 16 wherein the processor is configured to present the subset list to the user as an open dialog box.

22. The apparatus of claim 16 wherein the time tolerance includes a tolerance for weekends, holidays, or missed work days.

* * * * *